T. E. BROWN.
FLY TRAP.
APPLICATION FILED MAY 27, 1913.

1,102,642.

Patented July 7, 1914.

WITNESSES:

INVENTOR
T. E. Brown
BY
ATTORNEYS

UNITED STATES PATENT OFFICE.

THOMAS E. BROWN, OF PECOS, TEXAS.

FLY-TRAP.

1,102,642.  Specification of Letters Patent.  Patented July 7, 1914.

Application filed May 27, 1913. Serial No. 770,104.

*To all whom it may concern:*

Be it known that I, THOMAS E. BROWN, a citizen of the United States, residing at Pecos, in the county of Reeves and State of Texas, have invented certain new and useful Improvements in Fly-Traps, of which the following is a specification.

My invention relates to new and useful improvements in fly traps, and its object is to provide a trap which may be baited with some sweet smelling substance to attract the flies into an inclosure from which they will be unable to escape.

The object of my invention more specifically stated is to provide a fly trap comprising an open top vessel mounted in the upper portion of a glass casing spaced at its lower edge from a supporting surface, a funnel shaped passage being provided through which the flies may gain access to said vessel, which will contain some fluid in which the flies may be drowned.

Another object of the invention is to provide a device of the character described that will have an attractive appearance, and that will be strong, durable, simple and efficient and comparatively inexpensive in construction and also one that may be readily taken apart to be cleaned and easily put together again.

Figure 1:
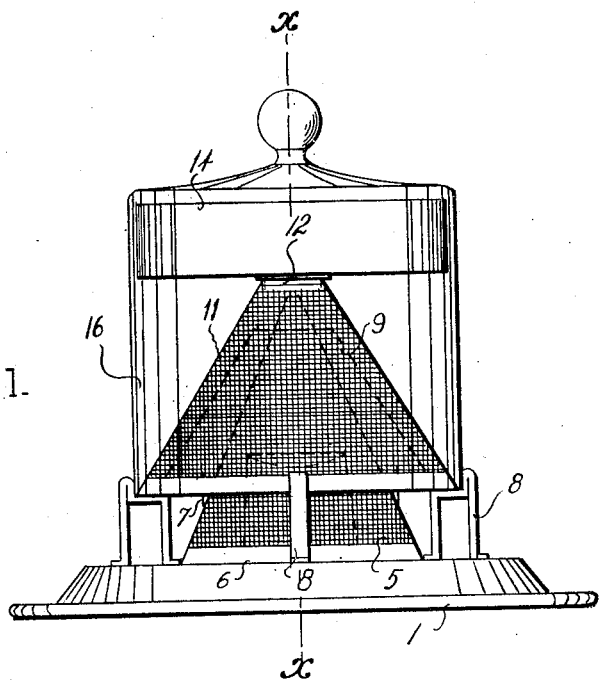
Figure 2:
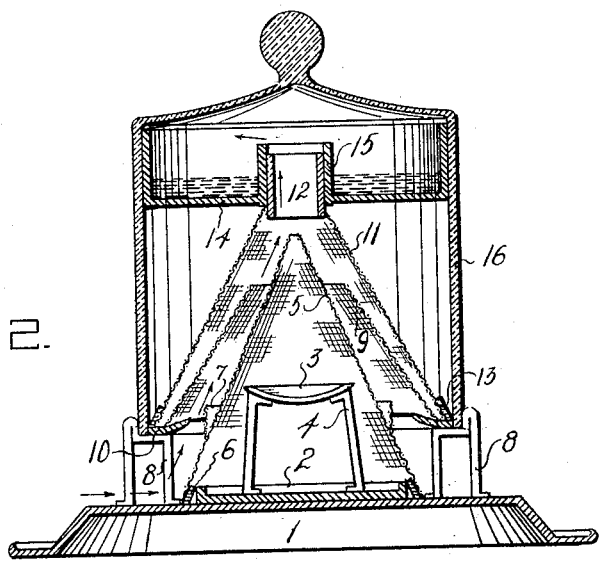

With these objects in view, by invention has relation to certain novel features of the construction, an example of which is described in the following specification, and illustrated in the accompanying drawing, wherein:

Figure 1 is a side elevation of my improved fly trap. Fig. 2 is a sectional elevation of the same, the section being taken on the line *x—x* of Fig. 1.

Referring now more particularly to the drawing, wherein like reference characters designate similar parts in both the figures, the numeral 1 denotes the metal base upon which my trap is supported, said base having the form of an inverted plate. Upon the center of the base 1, there is placed a shallow vessel 2 having a diameter considerably less than that of the base 1. A still smaller vessel 3 is supported at an elevation above the center of the vessel 2 by a pair of brackets 4. The vessel 3 will be filled with some sweet smelling fluid that will serve to attract flies, the purpose of the lower vessel 2 being to catch any accidental overflow from the smaller elevated vessel. The structure formed by the parts 2, 3 and 4 is inclosed within a cone 5 formed of fine wire screen, the base of said cone being held to its proper circular shape by a metal ring 6 inclosing the vessel 2 and rigidly connected with the cone 5 in any desired manner. A ring of wire netting 7 is mounted fast upon the cone 5 intermediate of its top and bottom, said ring being disposed concentrically with the cone and having its wall vertically disposed.

Upon the base 1 there are mounted fast four small brackets 8 equidistant from each other and from the center of the base and disposed closely adjacent to the bottom of the cone 5 so as to prevent lateral displacement of said cone, and of the structure comprising the parts 2, 3 and 4 mounted within the cone. The four brackets 8 form a seat upon which rests a frusto-conical screen wire structure 9, the axis of which is coincident with that of the cone 5, the wall of the structure 9 being spaced from that of the cone 5. The base of the structure 9 is held to its proper circular form by a metal ring 10 extending inwardly some distance from the lower edge of the structure 9 and turned slightly upward adjacent to its inner edge. A second frusto-conical structure of screen wire 11 rests upon the bracket 8 and has a wall spaced slightly outward from that of the structure 9. The aperture at the top of the structure 11 is of a lesser diameter than that formed at the top of the structure 9 and communicates with a short vertical tube 12. The base of the structure 11 is held to its proper circular form by a ring 13. The tube 12 supports a pan 14, the latter being provided with a central aperture in its bottom bordered by a collar 15 which receives the tube 12. The pan 14 will contain a fluid for the purpose of drowning any flies entering the pan through the tube 12, and if desired this fluid may be of a poisonous nature to kill the flies more quickly. A glass casing 16 having its top closed and its bottom open will rest upon the brackets 8 and will inclose the other parts supported by said bracket, closely fitting the wall of the pan 14.

In Fig. 2 a number of arrows are employed to indicate the path by which the flies may gain access to the pan 14. In entering the trap, the flies will crawl up the surface of the cone 5 to the apex thereof, from whence they will fly to the inner surface of the structure 9 crawling through the upper end of said structure and through the tube connecting therewith.

When necessary the glass casing may be raised and the pan 14 emptied of its contents. The various parts of the trap are made separable in order that they may be more easily cleaned. The wire netting ring provided upon the intermediate portion of the cone 5 will tend to prevent the flies from escaping downwardly after having reached the apex of said cone. The space formed between the structure 9, and the structure 11 will tend to trap any flies attempting to escape downwardly from the trap by crawling upon the inner face of the structure 11.

The invention is presented as including all such modifications and changes as properly come within the scope of the following claims.

What I claim is:

1. In a fly trap, the combination with a wire screen cone, of a vessel within the cone to receive the bait, a frusto-conical wire screen structure having its wall outwardly spaced from that of said cone and having its bottom edge raised above the surface supporting said cone, a vertical tube communicating with the top of the frusto-conical structure, a pan containing a fluid surmounted upon the frusto-conical structure, said pan being centrally apertured and formed with a flange bordering said aperture and receiving said tube, and a glass casing inclosing said parts having its edge spaced from the surface supporting the cone and having its wall fitting that of said pan.

2. A fly trap comprising a wire screen cone, a shallow vessel mounted in the bottom portion of said cone, a smaller shallow vessel centrally disposed at an elevation above the first mentioned vessel and containing bait, a frusto-conical wire screen structure having its wall spaced outwardly from that of said cone and having its bottom edge elevated above the surface supporting the cone, a tube communicating with the top of the frusto-conical structure, a pan containing a fluid supported by the frusto-conical structure with the center of which pan said tube communicates, and a glass casing closed at its top and open at its bottom inclosing said parts, the bottom of said casing being spaced from the surface supporting said cone and the wall of the casing being formed to closely fit the wall of said pan.

3. In an insect trap, a support, brackets mounted on the support, a ring carried by the brackets, a plurality of concentric wire screens carried by said ring in a spaced relation, a pan having communication at its center with the top of the outermost wire screen, a conical screen member disposed within the wire screens and spaced therefrom, a shallow vessel over which the screen member is mounted and a smaller vessel mounted within the conical screen member above the shallow vessel.

4. A fly trap comprising a wire screen cone, a shallow vessel centrally mounted in the bottom portion of said cone, a smaller shallow vessel centrally supported at an elevation above the first shallow vessel within said cone, the last named vessel being a bait receptacle, a ring mounted upon the intermediate portion of the cone and extending upwardly therefrom, a frusto-conical structure having its wall spaced from that of the cone and having its bottom edge elevated above the surface supporting the cone, a vertical tube communicating with the top of the frusto-conical structure, a centrally apertured pan surmounted upon the frusto-conical structure, and a flange inclosing the central aperture of the pan receiving said tube, and a glass casing open at its top and closed at its bottom inclosing said parts, the lower edge of said casing being elevated above the surface supporting the cone, and the wall of the casing fitting the wall of the pan.

5. A fly trap comprising a wire screen cone, a frusto-conical open topped wire screen structure having its wall spaced outwardly from that of said cone and having its lower edge elevated above the surface supporting the cone, an annular metal plate secured to the bottom edge of said frusto-conical structure, a second frusto-conical structure resting upon said metal plate having its wall spaced outwardly from the first named frusto-conical structure, a vertical tube communicating with the last mentioned frusto-conical structure, a centrally apertured pan surmounted upon the last mentioned frusto-conical structure, a collar inclosing the central aperture of the pan and receiving said tube, and a glass casing inclosing said parts having its top closed and its bottom open, the lower edge of said casing being spaced from the surface supporting the cone, and the wall of said casing being made to fit that of said pan.

6. A fly trap comprising a wire screen cone, a shallow vessel mounted within the cone containing bait, a wire screen ring mounted upon the exterior surface of the cone intermediate of its top and bottom, a frusto-conical wire screen structure open at its top and having its wall spaced outwardly from that of said cone, the bottom of said structure being spaced from the surface supporting said cone, an annular metal plate secured to the bottom of said frusto-conical structure, a second frusto-conical structure resting upon said annular plate, having its surface faced outwardly from that of the first mentioned frusto-conical structure, a vertical tube communicating with the top of the last mentioned frusto-conical structure, a pan surmounted upon the last mentioned frusto-conical structure provided with a central aperture, a flange inclosing said central aperture and receiving said tube, and a glass casing having its top closed and its bottom open inclosing said part, the bottom of said casing being spaced from the surface supporting the cone and the wall of the casing being made to fit the wall of said pan.

7. A fly trap comprising a circular base plate, a wire screen cone resting centrally upon said base plate, a shallow vessel mounted within said cone for containing bait, a plurality of brackets rigidly mounted upon said base adjacent to the base of said cone, a wire screen ring mounted upon the exterior surface of said cone intermediate of its top and bottom, a frusto-conical wire screen structure seated upon said bracket and having its wall spaced outwardly from that of said cone, said structure being open at its top, a second frusto-conical wire screen structure seated upon said bracket having its wall spaced outwardly from that of the first frusto-conical structure, a vertical tube communicating with the top of the second frusto-conical structure, a centrally apertured pan surmounted upon the second frusto-conical structure, a flange inclosing the central aperture of said pan and receiving said tube, a glass casing having its top closed and its bottom open inclosing said parts, said casing being supported upon said brackets and having its wall fitting the wall of said pan.

In testimony whereof I have signed my name to this specification in the presence of two subscribing witnesses.

THOMAS E. BROWN.

Witnesses:
J. B. GIBSON,
BRUCE DIORNISON.

---

Copies of this patent may be obtained for five cents each, by addressing the "Commissioner of Patents, Washington, D. C."